June 21, 1927.
L. W. DAVIS
1,633,316
DRIVING MECHANISM FOR MOTOR VEHICLES
Filed May 12, 1924  3 Sheets-Sheet 1
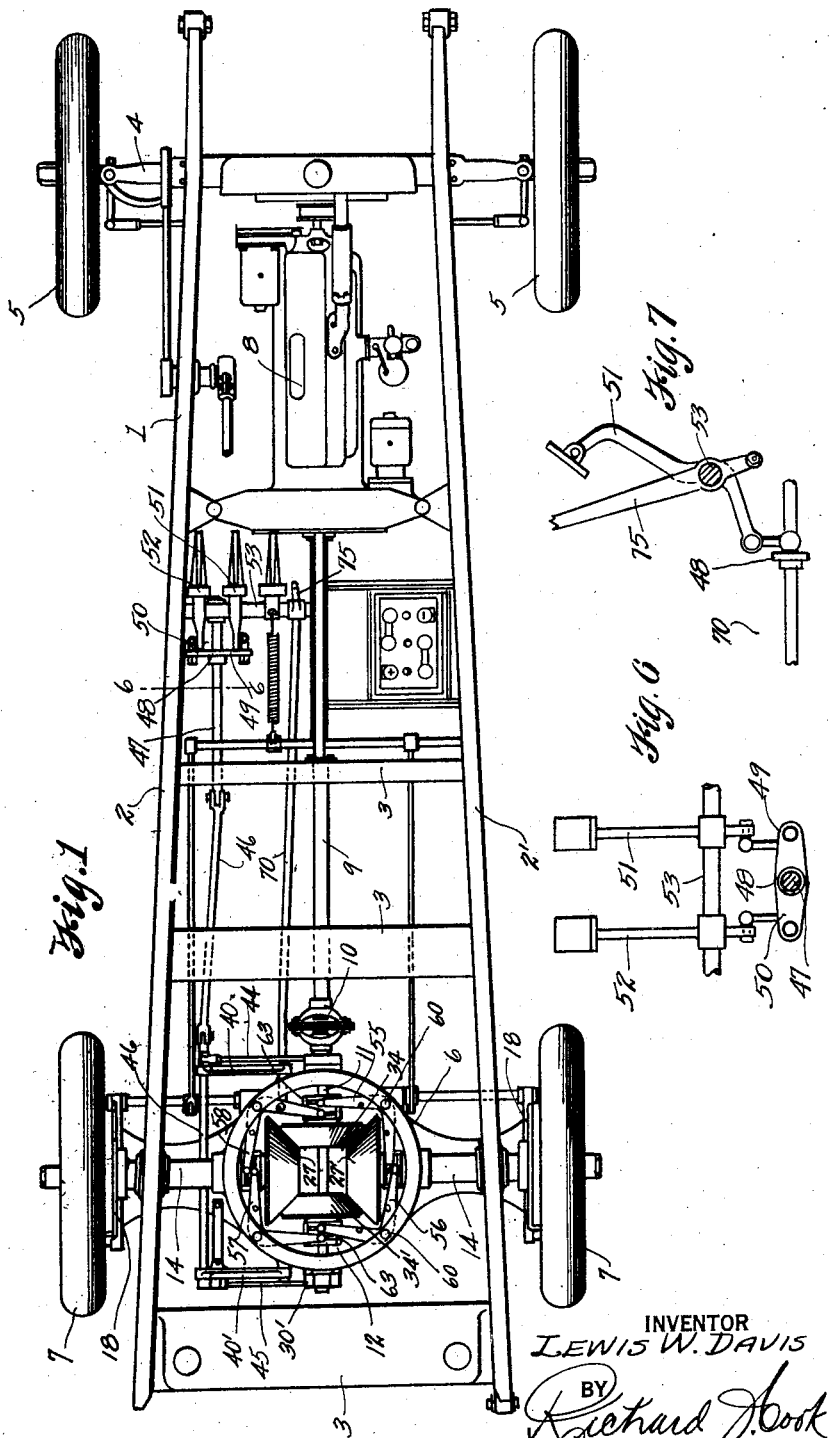
INVENTOR
LEWIS W. DAVIS
BY
Richard J. Hook
ATTORNEY

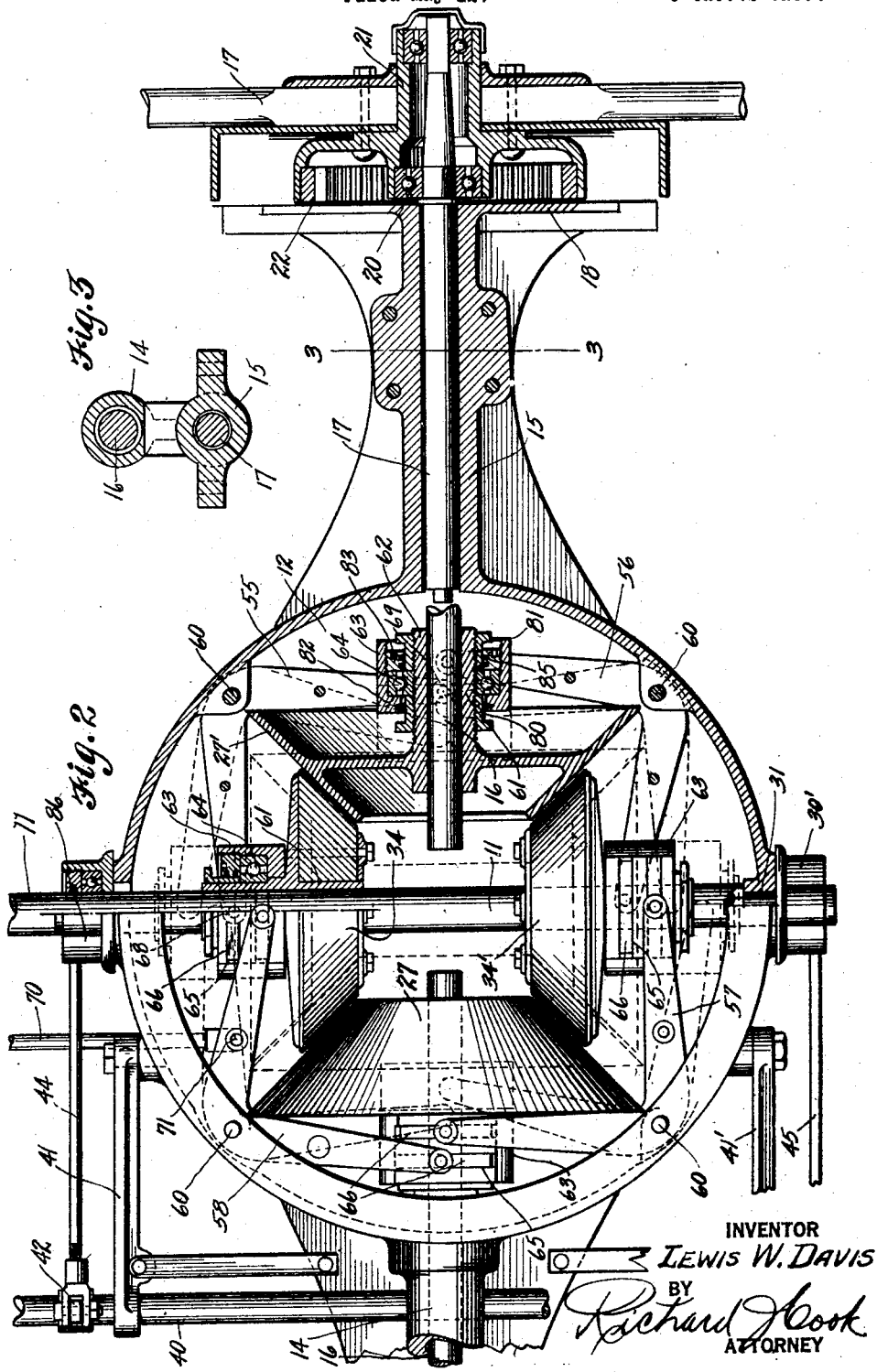

June 21, 1927.
L. W. DAVIS
1,633,316
DRIVING MECHANISM FOR MOTOR VEHICLES
Filed May 12, 1924   3 Sheets-Sheet 3
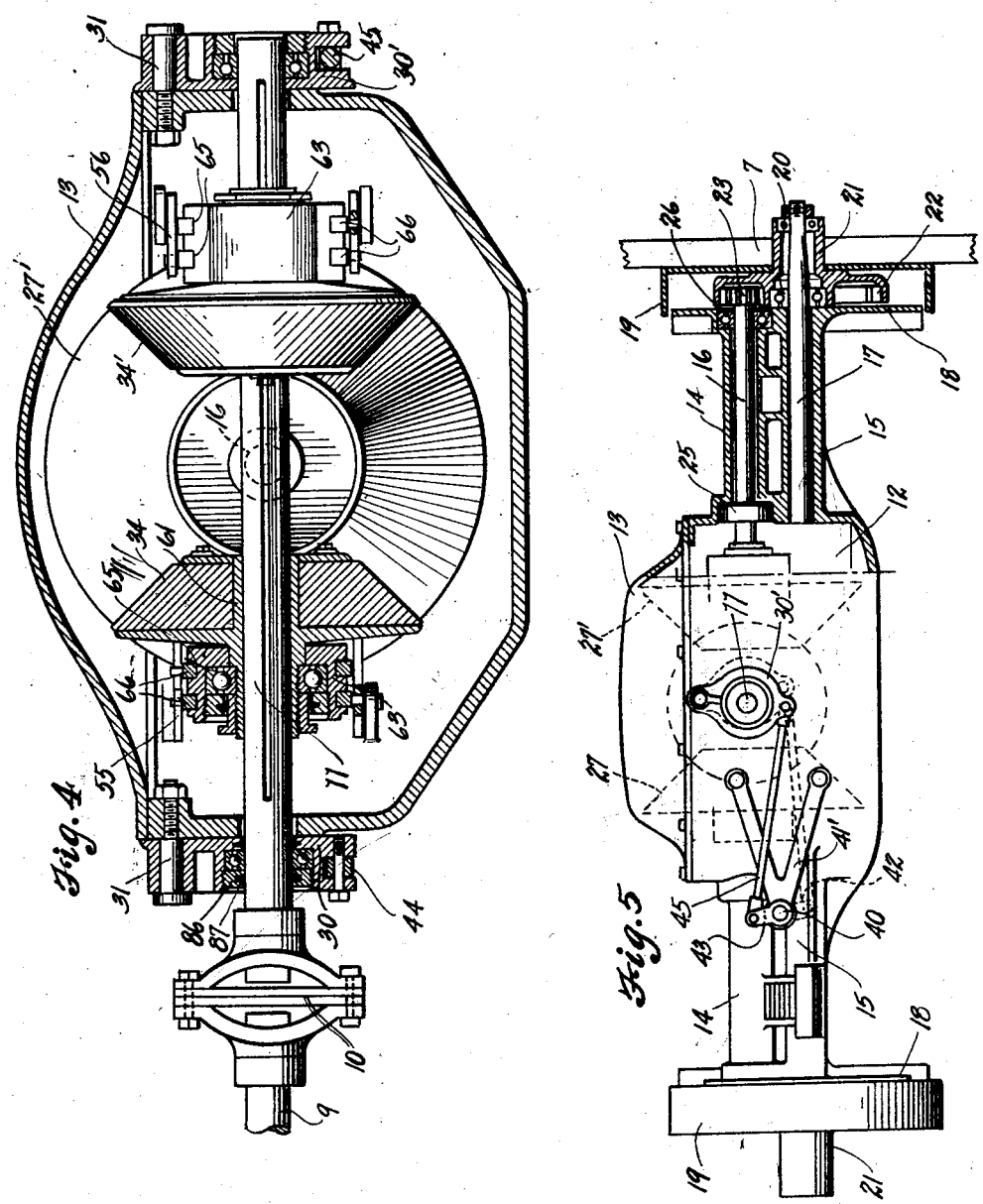
INVENTOR
LEWIS W. DAVIS
BY
Richard Cork
ATTORNEY Patented June 21, 1927.

1,633,316

UNITED STATES PATENT OFFICE.

LEWIS W. DAVIS, OF SEATTLE, WASHINGTON.

DRIVING MECHANISM FOR MOTOR VEHICLES.

Application filed May 12, 1924. Serial No. 712,609.

My invention relates to driving mechanism for motor vehicles, and more particularly it relates to improvements in the mechanism disclosed in United States Patents, issued to me under Numbers 1,107,412 and 1,241,609, respectively, on August 18, 1914, and October 17, 1917.

The principal object of this invention is to improve upon various details of construction, so that a better and more durable device is provided, and which makes possible the enclosing of the entire mechanism within a dust and water proof housing formed integral with the rear axle housings and the brake drum cover plates and which provides mountings for the springs whereby the vehicle frame is supported.

Another object resides in the improved means for mounting and actuating the driving shaft to move the driving cones from and into frictional driving contact with the axle driving cones.

Another object is to provide simple, effective and easily actuated control mechanism for shifting the driving cones to obtain the forward, reverse and change of speeds.

Still further objects of the invention reside in the various details of construction and combination of parts whereby a rigid, substantial, and efficient device is provided.

In accomplishing the various objects of the invention, I have provided the improved details of construction, the preferred forms of which are illustrated in the accompanying drawings, wherein—

Figure 1 is a plan view of a vehicle chassis and driving mechanism embodied by the present invention.

Figure 2 is an enlarged plan view of the driving mechanism; showing parts in section for better illustration.

Figure 3 is a transverse section taken on the line 3—3 in Figure 2.

Figure 4 is a vertical section centrally of the driving mechanism in the direction of the driving shaft.

Figure 5 is a rear elevation, partly in section, of the driving mechanism and axle housings.

Figure 6 is a sectional detail of parts of the control mechanism; the view being taken on the line 6—6 in Figure 1.

Figure 7 is a side view of the parts shown in Figure 2.

Referring more in detail to the several views of the drawings—

1 designates, in its entirety, a vehicle chassis which may be of the usual type of construction, comprising opposite side beams 2—2' and transverse connecting beams 3. At the front is a transverse axle 4 which supports the steering wheels 5 and at the rear is a housing 6 which encloses the transmission mechanism embodied by the present invention, and also forms housings for the supporting and driving axles, for the rear wheels 7, as will hereinafter be described. Supported within the chassis, is an engine, or motor 8 having a power transmission shaft 9 connected through universal couplings 10 with the driving shaft 11 of the present mechanism.

The housing 6 comprises a central, circular chamber 12 wherein the principal parts of the present mechanism are contained, and over which a cover 13 is removably fitted so as to give easy access to all the operating parts, and cast integral with this chamber are the oppositely extending upper and lower axle housings 14 and 15 wherein the opposite end sections of the wheel driving axles 16 and wheel supporting axles 17 are contained. Formed integral with the outer ends of these latter housings are circular disks 18 which form the cover plates for brake drums 19 secured to the inner faces of the driving wheels 7.

The axles 17 may be rotatably or freely mounted in their housings and have the wheels 7 rotatably mounted at their outer ends upon anti-friction bearings, as indicated at 20. The hub portion 21 of each of these wheels comprises an inwardly opening, internally geared drum 22 centrally within its brake drum and these are adapted to be driven by means of gears 23 fixed upon the ends of the driving shafts 16. By this construction, a desired reduction of speed between shafts 16 and the wheels, is obtained.

The axles 16 are in axial alinement and are rotatably mounted, adjacent their inner and outer ends, respectively, in anti-friction bearings 25 and 26 with their inner ends extended substantially within the housing chamber 12, and upon these inner end driving cones 27—27' are keyed for longitudinal movement thereon, so that they may be shifted toward and from each other.

The driving shaft 11 extends transversely through the housing chamber 12 with its axial line bisecting the axial lines of shafts 16. It is revolubly mounted, adjacent its opposite ends, in bearing blocks 30 and 30' that are pivotally suspended from their upper end portions by means of pins 31 fixed within the front and rearward walls of the housing, as is best illustrated in Figure 4, so that the shaft may be adjusted, as presently described, to provide for forward or reverse driving.

Feather keyed on the shaft 11 are paired driving cones 34—34' which are adapted to frictionally engage with and drive the cones 27—27'. It will be stated here that the mounting of shaft 11 is such that the cones 34—34' separately engage with the cones 27—27'; that is, one side of cone 34 will engage with cone 27 while the opposite side of cone 34' will engage with cone 27', and by rotatable adjustment of shaft 11, by a shifting of its supporting bearings 30—30' in opposite directions, will cause the opposite sides of the cones 34—34' to engage with the cones 27—27' to reverse the direction of driving of the axles 16.

The means provided for shifting the shaft 11 comprises a rocker shaft 40 supported rotatably in bearings provided at the outer ends of brackets 41—41' that are bolted to the housing 6. This shaft is supported horizontally and parallel with shaft 11 and extends between the tubular housings of axles 16 and 17, as is best shown in Figure 5. Secured to its opposite ends are rocker arms 42 and 43, which are respectively extended upwardly and downwardly and are respectively connected by links 44 and 45 with the lower end portions of the bearing blocks which support shaft 11.

The shaft 40 is connected for rotation through a shaft 46 with a shaft 47 on which a rocker 48 is fixed and which has oppositely extending arms 49—50 connected respectively with foot pedals 51 and 52 mounted on a supporting shaft 53 and which, upon being depressed will cause opposite rotative movement of shaft 40 which, through its link connection with bearings 30—30' will cause shaft 11 to be shifted to cause the driving cones 34—34', respectively, to engage with cones 27—27' or vice versa, to provide either a forward or a reverse drive. The clearance between the driving and the driven cones is very slight, and for this reason the shaft 11 need be shifted but slightly to reverse the direction of the drive.

The different driving speeds for either forward or reverse driving are obtained by simultaneously shifting the driving cones 34—34' from and toward each other so as to contact the surfaces of the driven cones 27—27' closer or farther from the axial lines. The cones are all held in frictional driving contact and are shifted simultaneously by means of four sets of bell crank levers 55, 56, 57 and 58 that are pivotally supported on bolts 60 mounted vertically in the housing 6. Each of the driving and driven cones is provided with a hub portion 61 by which it is keyed to its shaft, and each hub has an exteriorly threaded end portion 62 extended from the outer face of its cone whereon shifting blocks 63 are secured to rotate upon anti-friction bearings 64. The upper and lower faces of each of these blocks is provided with transverse slots 65 wherein bars 66 are slidably fitted. The bell crank levers 55 have their opposite ends pivotally connected by pins 68 and 69 with bars 66 slidable in the slots provided in upper and lower faces of the shifting blocks 63, respectively, for the cones 34 and 27'. The bell cranks 56 are likewise connected at their ends with the shifting blocks for the cones 27' and 34'. In a like manner bell cranks 57 connect at their ends with the shifting blocks 63 of the cones 34' and 27, and bell cranks 58 connect the shifting blocks of cones 27 and 34. A shifting rod 70 extends at its rearward end through the forward wall of housing 6, and pivotally connects with a bolt 71 that is fixed between the arms of bell cranks 58 that connect with the shifting block of cone 34. The forward end of rod 70 connects with a control lever 75 that is pivotally supported by shaft 53 and which may be adjusted forwardly or rearwardly to move bell cranks 58 to effect the shifting of all the cones to obtain a desired driving speed.

It is preferred to form the driven cones 27—27' of a suitable metal, and to provide driving cones of fibre or other suitable material. Should it be desired to make any adjustments incidental to wear on the surfaces of the cones, this is provided for in the connection of the shifting blocks on the collars of the cones 27—27'. As is best shown in Figure 2, the blocks 63 are supported through the intermediacy of an anti-friction bearing; the inner ring of which is threaded onto the cone hub collar and which may be adjusted to different positions thereon and then locked at any position of adjustment between two locking rings 80—81 threaded on the collar at opposite sides of the bearing. The outer ring of the bearing seats against an annular shoulder 82 within the block and is held by a retaining ring 83 that is threaded into the block against it. Such adjustment is not required for the driving cones, but the manner of mounting the blocks for these cones is substantially the same as is shown in Figure 4.

It is preferred that the retaining rings for the bearings within each of the shifting blocks be provided with suitable packing rings, as shown at 85, whereby oil will be retained as long as possible about the bearings. It is also desired that the bearing rings contained within the bearing and supporting blocks 30—30' wherein shaft 11 is held, be held in place by retaining rings 86 provided with packing rings 87 which will prevent leakage of oil.

I claim:

1. In a variable speed transmission mechanism, a movably mounted driving shaft, a pair of wheel driving shafts mounted in alinement at opposite sides and substantially at right angles to the driving shaft, a pair of friction cones slidably keyed to the driving shaft, a driving cone slidably keyed on each of the wheel driving shafts; each of said cones having a hub, a shifting block for each cone rotatably fixed to its hub and having transverse grooves therein, bars slidably fitted in the grooves, a series of pivotally mounted bell crank levers with ends pivotally fixed to the bars in the blocks of adjacent cones whereby all cones may be simultaneously shifted along their shafts and means for moving the driving shaft whereby either cone therein can be made to drive either of the other cones.

2. In a variable speed transmission mechanism, a movably mounted driving shaft, a pair of wheel driving shafts mounted in alinement at opposite sides of the driving shaft, a pair of friction cones slidably keyed to the driving shaft, driving cones slidably keyed on each of the wheel driving shafts, each of said cones having a hub with an exteriorly threaded extension, shifting blocks for the cones disposed about the cone hubs, an anti-friction bearing threaded onto each of the extensions and rotatably mounting said blocks, locking collars threaded on the extensions at opposite sides of the bearings to retain them at adjusted positions, a series of pivotally mounted bell cranks having ends slidably connected with the shifting blocks of adjacent cones whereby all cones will be simultaneously shifted along their shafts, means for moving the driving shaft whereby either cone thereon can be made to drive either of the other cones.

3. In a variable speed transmission mechanism, a transmission and axle housing, a pair of wheel driving shafts mounted within the housing, a driving shaft, supporting bearings for the driving shaft pivotally secured to opposite sides of the housing, a pair of friction cones slidably keyed on the driving shaft, driving cones slidably keyed on the wheel drive shafts, a shifting block for each cone, means connecting the shifting blocks whereby all cones may be simultaneously moved along their shafts, a rocker shaft, rocker arms fixed thereon and links connecting the rocker arms with the pivotally mounted supporting bearings whereby the driving shaft, upon rotation of the rocker shaft in opposite directions, may be shifted so that either cone thereon can be made to drive either of the other cones.

4. In a device as stated in claim 3, a rocker lever fixed to the rocker shaft with oppositely extending arms and control pedals pivotally mounted and operatively connected with the opposite arms of the rocker lever for the purpose set forth.

5. A variable speed transmission mechanism, comprising a one piece casting forming a transmission housing and axle housings, a pair of wheel supporting shafts and a pair of wheel driving shafts mounted in the axle housings, a driving shaft extended through the housing, supporting bearings for the driving shaft pivotally suspended from the opposite walls of the housing, friction driving cones slidably keyed to the driving shaft, friction cones slidably keyed to the wheel driving shafts, shifting blocks for each of the cones, means for simultaneously moving all of the cones along their shafts, a rocker shaft, rocker arms fixed to the said shaft, links connecting the arms with the opposite end supporting bearings of the driving shafts, means for rotating the rocker shaft in opposite directions to move the driving shaft so as to cause either of the driving cones to frictionally engage either of the other cones.

Signed at Seattle, King County, Washington, this 30th day of August, 1923.

LEWIS W. DAVIS.